Nov. 11, 1958 J. W. GILES 2,860,330

AMPLIFICATION CONTROL ARRANGEMENT

Filed March 27, 1952 2 Sheets-Sheet 1

Inventor:
Jack W. Giles
by Merton D. Morse
His Attorney.

Nov. 11, 1958 J. W. GILES 2,860,330

AMPLIFICATION CONTROL ARRANGEMENT

Filed March 27, 1952 2 Sheets-Sheet 2

Inventor:
Jack W. Giles,
by Merton D. Morse
His Attorney.

United States Patent Office 2,860,330

Patented Nov. 11, 1958

2,860,330

AMPLIFICATION CONTROL ARRANGEMENT

Jack W. Giles, Camillus, N. Y., assignor to General Electric Company, a corporation of New York Application March 27, 1952, Serial No. 278,841

18 Claims. (Cl. 343—7.3)

My invention relates to a wave-translating apparatus and, more particularly, pertains to a novel method of amplification control and a novel noise-responsive control circuit for adjusting the amplification of such apparatus.

Although not limited to any particular application, my present invention is ideally suited for inclusion in a receiver of a pulse-echo or radar system and is utilized to maintain a constant level of noise at the receiver output. By this means an alarm circuit, supplied with the receiver output, may properly respond to intercepted echo pulses of an amplitude just great enough to override the noise. For convenience the invention will be described in that connection.

My invention has for a general object the provision of a novel method of amplification control as well as a novel noise-responsive control circuit which may be employed to regulate amplification in one or more stages of a receiver in accordance with impulse-type noise components and which is essentially unaffected by occasional noise impulses of exceedingly high amplitude that might otherwise produce an undesirable change is amplification and thus preclude satisfactory noise leveling of the output of the receiver.

Another object of my invention is to provide a novel noise-responsive control circuit which is relatively immune to variations in noise amplitude above a predetermined amplitude value.

Still another object of my invention is to provide a novel noise-responsive control circuit which produces a control potential of a magnitude dependent upon the occurrences of noise impulses above a predetermined amplitude per unit time, rather than upon noise amplitude.

The method of adjusting amplification of wave-translating apparatus, according to one feature of my invention, comprises counting the number of noise pulses occurring during predetermined intervals of time to derive a summation and varying the amplification of the apparatus in accordance with the summation.

A noise-responsive control circuit in accordance with another feature of my present invention is adapted for inclusion in wave-translating apparatus having an output circuit wherein impulse type noise appears and having a controlled circuit. The control circuit comprises means coupled to the output circuit for counting the number of noise impulses having a predetermined characteristic to derive a control potential representing that number. The counting means is coupled to the controlled circuit of the translating apparatus so that this control potential may be utilized to adjust an operating characteristic of the translating apparatus.

Figure 1:
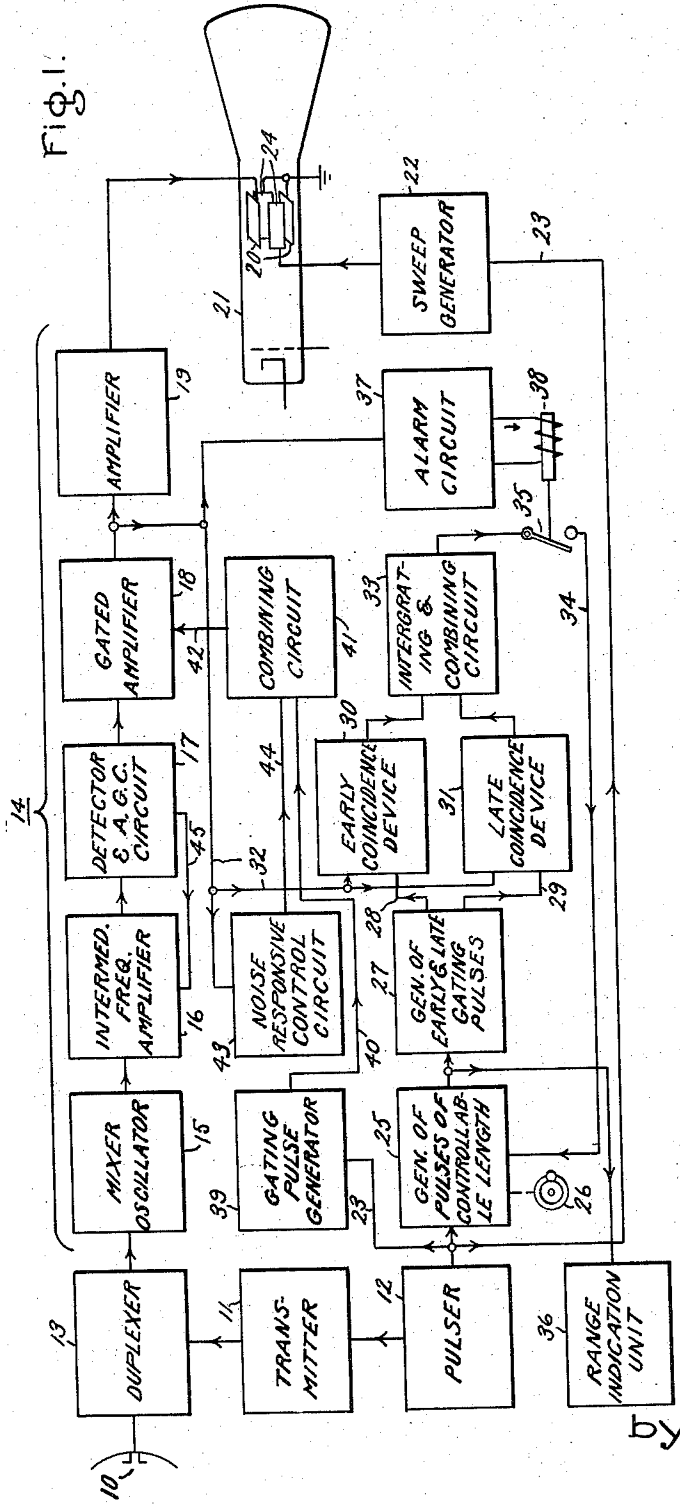
Figure 3:
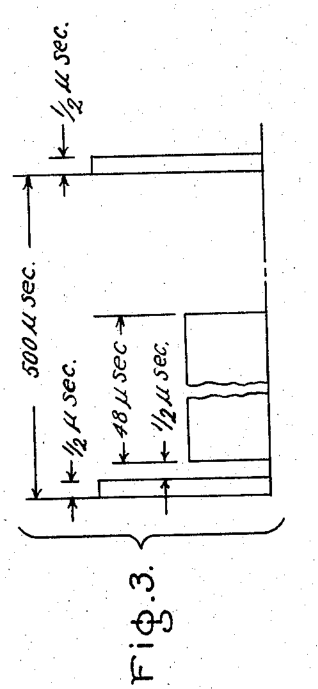
Figure 2:
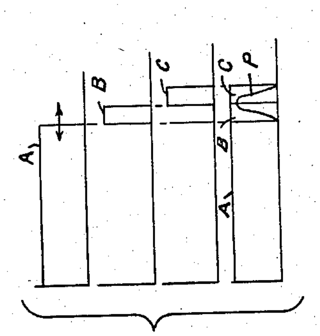
Figure 4:
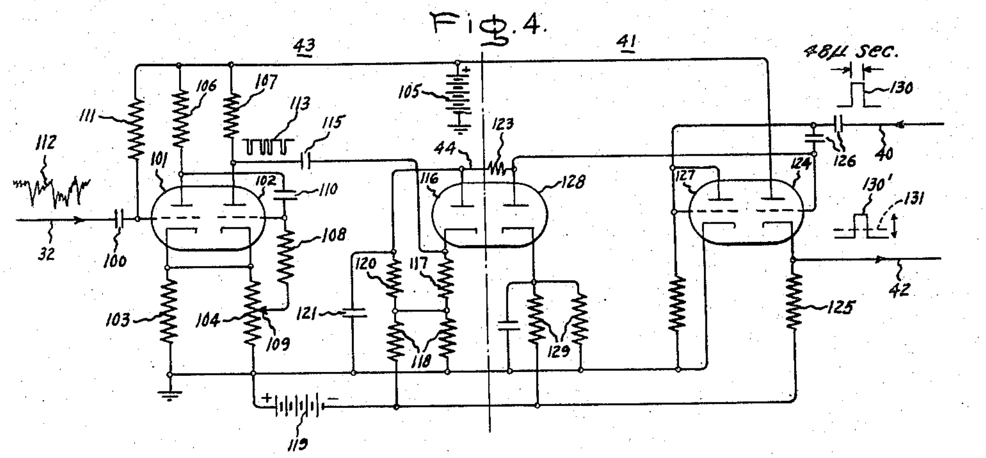
Figure 5:
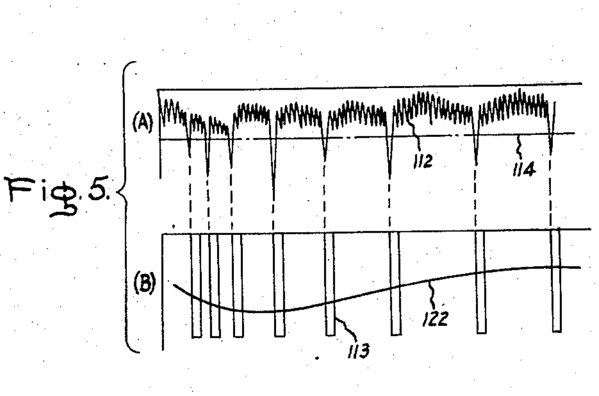
Figure 6:
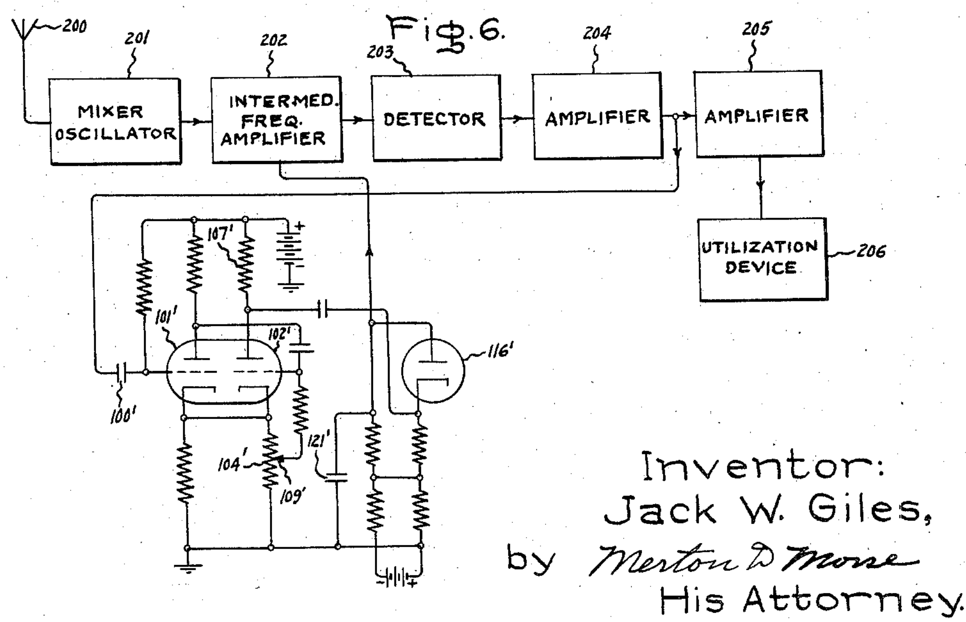

The novel features which are believed to be characteristic of my invention are set forth with particularity in the appended claims. The invention itself, however, both as to its organization and method of operation, together with further objects and advantages thereof may best be understood by reference to the following description taken in connection with the accompanying drawings in which Fig. 1 is a block diagram of a complete radar system including a receiver embodying a noise-responsive control circuit in accordance with my present invention; Figs. 2 and 3 represent certain characteristics pertaining to the operation of portions of the apparatus shown in Fig. 1; Fig. 4 is a detailed schematic diagram of a noise-responsive control circuit constructed in accordance with the present invention and which may be incorporated in the apparatus shown in Fig. 1; Fig. 5 represents certain characteristics pertaining to the operation of the circuit shown in Fig. 4; and Fig. 6 illustrates a receiver incorporating another embodiment of my invention.

Referring now to Fig. 1 of the drawings, there is shown a directional antenna 10 to which pulses of radio-frequency energy having a frequency in the ultra-high frequency range are supplied by a transmitter 11 for radiation into space. This transmitter is controlled by a pulser or keyer 12, which provides pulses having a duration of, for example, one-half microsecond and may recur at a frequency of 2,000 cycles per second. The radiated pulses, which may be of the same duration, travel through space and may impinge upon a reflecting surface of an object and are thus returned toward the sight of the radar apparatus for interception by antenna 10.

Received echo-pulses from the antenna are supplied through a duplexer unit 13 to a receiver 14. Duplexer 13 may be of any suitable construction serving to prevent damage and/or blocking of the receiver 14 during pulsing of transmitter 11. Moreover, the duplexer translates intercepted signals from the antenna to the receiver with substantially no attenuation.

The received pulses of radio-frequency energy are supplied to a mixer-oscillator 15 of receiver 14 which may be preceded by one or more stages of radio-frequency amplification (not shown). The radio-frequency energy is heterodyned with local oscillations and an intermediate-frequency wave carrying the pulse components is supplied by unit 15 to an intermediate-frequency amplifier 16. After amplification in amplifier 16, the pulses of intermediate-frequency energy are applied to a detector and automatic gain control (A. G. C.) stage 17 and the detected pulses are supplied via cascaded amplifiers 18 and 19 to vertical deflection plates 20 of a cathode ray type indicator 21. Thus, the beam within indicator 21 is deflected vertically in response to each received echo pulse.

As is generally well known, the travel time for a pulse in leaving and returning to antenna 10 represents the range of a reflecting target. In order to determine the range of a target which produces an echo-pulse that causes the beam within cathode ray indicator 21 to be deflected, the equipment includes a sweep generator 22 which is connected to pulser 12 by a lead 23. Generator 22 supplies to horizontal deflection plates 24 of indicator 21 a sawtooth sweep wave which deflects the electron beam horizontally across the indicator's viewing screen. This deflection begins at one side of the screen at the instant a pulse is transmitted by antenna 10 and proceeds across screen at a linear rate. The time interval of the entire sweep corresponds to the range of the equipment and the distance on the screen between the indications of the transmitted pulse and of the echo is proportional to the distance to the corresponding reflecting object. Thus, the apparatus may be employed to determine the distance to objects disposed within its operating range.

The apparatus shown in Fig. 1 also includes provisions for selecting a particular one of the received echoes and to indicate continuously the range of the object producing that echo. This type of arrangement is commonly referred to as "automatic range tracking" and one example of such apparatus is illustrated in Patent 2,467,208 of William C. Hahn.

The automatic range tracking apparatus comprises a generator 25 which provides pulses of controllable length. Generator 25 is coupled with pulser 12 and the leading edge of each generated pulse occurs concomitantly with the pulsing of transmitter 11. The length of the pulse is dependent upon the distance to a remote object being tracked, or if none is being tracked, upon the position of a manually-operated control 26. These pulses may be as represented by curve A in Fig. 2, which illustrates various wave forms in the automatic range tracking equipment plotted to the same time scale.

Generator 25 is coupled to another generator 27 which provides early and late aperture or gating pulses at leads 28 and 29. These pulses are of equal, fixed length and may be of the waveform represented by curves B and C of Fig. 2, respectively. It will be observed in Fig. 2 that gating pulse "B" is initiated at the termination of pulse "A" and that gating pulse "C" is initiated at the termination of gating pulse "B." These pulses "A, B and C" are represented in end-to-end relationship on the lower line of Fig. 2.

The early and late gating pulses at leads 28 and 29, respectively, are supplied to early and late coincidence devices 30 and 31 which are normally inoperative, but which are operatively conditioned in response to the associated gating pulses. The detected echoes in receiver 14 are supplied from amplifier 18 over a lead 32 to each of the coincidence devices 30 and 31 and the amount of conduction in each of these devices is dependent upon the timing of a received echo pulse relative to the "B" and "C" gating pulses. This may be more apparent from the representation at the lower line of Fig. 2 wherein an echo pulse "P" is shown as being equally bracketed in time by gating pulses "B" and "C." Such a timing relationship means that each of devices 30 and 31 conduct equal amounts of current. However, should echo pulse "P" be displaced in time in one sense or the other, from that illustrated, the amount of conduction in the coincidence devices becomes unbalanced in a corresponding manner.

An integrating and combining circuit 33 is coupled to devices 30 and 31 and serves to integrate the currents therein and to produce a potential which, assuming that contacts 35 are closed, is applied over a conductor 34 to generator 25. This potential controls the length of the "A" pulses to maintain the time of occurrence of the "B" and "C" pulses such that the selected echo is received equally during the latter pulses, as illustrated at the lower line of Fig. 2. The potential on conductor 34 has an amplitude and polarity dependent upon the relative proportions of this echo received during the occurrences of the "B" and "C" pulses and controls the duration of the "A" pulse.

Thus, the length of the "A" pulse is varied until the received echo pulse is equally bracketed in time by the "B" and "C" pulses. If for any reason this condition is altered such as by movement of the reflecting object, a control potential is applied over lead 34 and the required correction in "A" pulse length is made. In this way a reflecting target is automatically tracked in range by the radar apparatus of Fig. 1.

For the constructional details of elements 25, 27, 30, 31 and 33 of the tracking equipment, reference is made to the aforementioned patent to William C. Hahn. A range indication unit 36, such as shown in this patent, may be optionally coupled with generator 25 for providing a continuous indication of the range of an object being tracked.

In operation, if no echo pulses are being received, control 26 may be manipulated effectively to search the operating range of the equipment. Of course, any well-known form of automatic range-searching circuit (not shown) may be employed for this purpose, however, for the sake of simplicity of representation, manual operation is illustrated.

The output of amplifier 18 is also applied to an alarm circuit 37 over an extension of lead 32. Alarm circuit 37 may be of any well-known construction which is adjusted for actuation by echo signals having an amplitude at least slightly greater than a predetermined noise level. When such echoes are supplied to the alarm circuit, a relay coil 38 is actuated thereby closing normally open contacts 35. This applies the control potential of circuit 33 to lead 34 for transmission to generator 27 and automatic range tracking occurs in the manner previously described herein.

In order to prevent the tracking system from responding to undesired reflections from remote objects located outside the limits of a selected range, amplifier 18 is normally disabled and is operatively conditioned during intervals wherein desired echo pulses occur. Any well-known form of circuit may be employed for this purpose, such as one incorporating a variable mu-type electron discharge that is suitably biased. Thus, in response to each pulse supplied by a gating pulse generator 39 over a lead 40, a combining circuit 41 (to be described in detail hereinafter) and a lead 42, amplifier 18 is enabled to translate the detected pulse wave from unit 17.

Generator 39 is coupled to pulser 12 by an extension of lead 23 and the developed pulses occur in fixed timing relationship relative to the keying pulses which operate transmitter 11. This is represented in Fig. 3 wherein the pulses from unit 12 are shown as having a duration of one-half microsecond and a recurrent period of 500 microseconds. One-half microsecond following each of these pulses, generator 39 develops a rectangular gating pulse having a duration of 48 microseconds. Thus, only those echo pulses which occur during each of the designated 48 microsecond intervals are translated by amplifier 18 to lead 32.

It has been found desirable to main a constant noise level at lead 32 so that alarm circuit 37 may respond to weak as well as to strong echo pulses. This is desirable since without such control, if alarm circuit 37 is adjusted for weak echoes whose amplitude approach the noise level, occasional increases in noise level may actuate the alarm circuit. Moreover, if the adjustment provides too great a margin between echo amplitude and noise level, weak echoes may not actuate the alarm. Such undesirable operation materially impairs the usefulness of the radar apparatus and a noise-responsive control circuit in accordance with my present invention is ideally suited to obviate this condition.

The output of amplifier 18 is connected by lead 32 to noise-responsive control circuit 43, which will be described in detail hereinafter. As will be shown, circuit 43 develops a control potential having a magnitude depending upon the number of noise impulses, above an adjustably-fixed amplitude level, which occur in a given interval of time. This control potential is applied over a lead 44 to combining circuit 41 where it is employed to adjust the amplitude of the gating pulses that operatively condition amplifier 18 during the aforementioned 48 microsecond intervals. Thus, the gating pulses not only serve to enable amplifier 18, but amplification is dependent upon the noise-responsive control potential developed by circuit 43.

It may, therefore, be seen that during the range-search phase of the operation of the apparatus shown in Fig. 1, the amplification of stage 18 is controlled in response to the noise output thereof and a constant noise level output is thereby maintained.

Alarm circuit 37 is adjusted to respond to echo pulses having an amplitude at least equal to a value just greater than the noise level. With the interception of echo pulses that occur in the selected 48 microsecond intervals, alarm 37 is actuated and automatic range tracking occurs in the manner described hereinbefore. The automatic gain control circuit portion of unit 17, which is of conventional construction, is unresponsive to the usual noise amplitudes. It responds to the received echo pulses and develops a gain-control potential. This potential is applied over a lead 45 to intermediate-frequency amplifier 16 and automatic gain control is effected in a known manner. As will be later shown, circuit 43 is rendered inoperative during this range-tracking phase of operation.

Referring to Fig. 4, this figure shows the details of the noise-responsive control circuit 43 and combining circuit 41, which operate to produce gating pulses of variable amplitude that are supplied over conductor 42 to control amplifier 18. The output of amplifier 18 (Fig. 1) is supplied over lead 32 through a capacitance 100 to a multivibrator comprising electron discharge devices 101 and 102. The cathodes of the two discharge devices 101 and 102 are connected together and to ground through parallel resistances 103 and 104. Their anodes are connected to the positive terminal of a source of operating potential 105 through respective resistances 106 and 107. The control electrode of device 102 is connected through a resistor 108 to a variable tap 109 of resistor 104 and further is connected to the anode of device 101 through a coupling condenser 110. The control grid of device 101 is connected through a grid resistor 111 to the positive terminal of source 105 and is connected to lead 32 through the condenser 100.

Since the grid of device 101 is connected to the positive terminal of source 105, this device is highly conductive in the normal operating condition of the multivibrator. In this condition, the conductivity of device 102 depends upon the anode current drawn by device 101 through the common cathode resistors 103—104 and the position of variable tap 109 of resistor 104. Whatever the position of the tap, since device 101 is highly conductive, the resulting voltage drop across cathode resistors 103—104 is sufficient to bias device 102 beyond cut off and normally no anode current flows therein.

If, for example, a negative potential of sufficient amplitude be applied to the grid-cathode circuit of the conductive device 101, the potential at its anode increases in a positive direction. This positive change in potential, applied via condenser 110 to the grid of device 102, if large enough, effectively removes the cut off bias from device 102 and anode current flows therein. This current produces a potential drop across cathode resistors 103—104 and since the cathodes of devices 101 and 102 are connected together, the potential at the cathode of device 101 is increased in a positive sense relative to the grid. This is in the same sense as produced by the initially-applied potential and, hence, the action is regenerative to effect an almost instantaneous change in operating condition, with device 102 highly conductive and device 101 cut off.

In the altered condition of operation, the anode of device 101 is essentially at the potential of the positive terminal of source 105 and condenser 110 begins to charge to the source potential. The charge path for the condenser includes, in addition to anode resistor 106, the grid resistor 108, and because the charge rate is high at the outset, and falls off exponentially, a high positive potential is initially developed across resistor 108 to maintain conduction in device 102. The potential is gradually reduced as the charge on the condenser accumulates and thus the control grid of device 102 is carried in a negative direction relative to its cathode. This decreases the flow of anode current in device 102 thereby decreasing the voltage drop across cathode resistors 103—104 and reducing the potential applied to the cathode of device 101. At the instant the applied cathode voltage becomes sufficiently low to remove the cutoff bias from device 101, that device conducts anode current and a voltage drop is produced across anode resistor 106. This change in potential, which is in a negative sense, is applied via condenser 110 to the grid of device 102 and because of the regenerative action the devices return essentially instantaneously to their initially-assumed conditions with condenser 110 quickly discharging through the anode-cathode current path of device 101.

Thus, it may be seen that for each negative pulse applied to the grid circuit of device 101, such as those of wave 112, there is developed a negative pulse across anode resistor 107 of device 102, represented in wave 113. The amplitude of the developed pulses depends upon the circuit constants of the multivibrator and the operating characteristics of devices 101 and 102, rather than upon the amplitude of the applied pulses and, hence, the output pulses of the multivibrator are of constant amplitude. Moreover, the duration of the developed pulses depends upon the time constant of the charging circuit for condenser 110. Consequently, the output pulses are of fixed duration and amplitude.

The noise wave 112 applied to device 101 is also represented by curve (A) in Fig. 5. This figure illustrates various wave forms of the circuit in Fig. 3 plotted to the same time scale. As will be observed, the noise wave is composed of randomly occurring impulses of varying amplitudes and the objective of the circuit shown in Fig. 4 is to derive a control potential which is dependent solely upon the time-occurrences of the noise impulses, rather than their amplitudes.

As just pointed out, for each pulse supplied to the grid-cathode circuit of device 101, an output pulse is derived at resistor 107. In order for multivibrator 101—102 to respond to noise impulses of a given amplitude, tap 109 is adjusted to establish a threshold amplitude level below which no operation occurs. This level is illustrated by horizontal dash-dot line 114 in Fig. 5(A). Thus, for each of the noise impulses which have an amplitude at least equal to threshold level 114, multivibrator 101—102 produces an output pulse of fixed amplitude and duration. These pulses are represented by wave 113 in Fig. 5(B) and their correspondence in timing with the noise impulses is illustrated by the vertical-construction lines.

Output pulses from multivibrator 101—102 are applied through a coupling condenser 115 to the cathode of a diode rectifier 116. The cathode of diode 116 is connected through a resistor 117 to a voltage divider 118 that is shunted across a source of negative operating potential 119. Its anode is connected to divider 118 through a resistor 120 and to ground through a charging condenser 121.

Normally, diode 116 conducts little, if any, current since in the absence of applied pulses there is no other applied potential. However, with each pulse supplied via condenser 115, the cathode of the diode is carried negative relative to its anode and the resulting anode current produces a voltage drop across resistor 120. Consequently, during the occurrence of each pulse, condenser 121 is quickly charged through diode 116 to a given potential. After the occurrence of the pulse, condenser 121 discharges through resistors 120 and 118 and since the resistance of this path is selected to be much greater than the resistance of diode 116 in the direction of current conduction, the condenser discharges relatively slowly. The condenser thus time-integrates the pulses developed by multivibrator 101—102 and the potential of the condenser has a magnitude which represents the number of pulses in any series developed by the multivibrator which occur within a given interval of time. For example, a continuous train of closely spaced pulses produces a high charge potential on condenser 121, whereas pulses having a greater spacing produce a lower potential. This is illustrated by curve 122 in Fig. 5(B) and, hence, it is apparent that the charge potential of condenser 121 represents the number of noise pulses, above a given amplitude, which occur within a given interval of time.

Since the pulses which charge condenser 121 are of constant amplitude and fixed duration, this control potential varies as the number of noise pulses per unit time varies and is substantially unresponsive to their amplitudes. Although a particular form of pulse generator has been illustrated for generating such pulses, any other type which produces pulses of constant amplitude and fixed duration may be suitably employed.

In order to utilize this control potential, the junction of condenser 121 and the anode of diode 116 is connected via lead 44 and a coupling resistor 123 to the control electrode of an electron discharge device 124 included in combining circuit 41. Electron discharge device 124 has its anode directly connected to the positive terminal of source 105 and its cathode connected to the negative terminal of source 119 through a cathode load resistor 125. Lead 42 is connected to the cathode of device 124 which operates as a cathode follower to translate the wave applied to its grid with no change of polarity.

The gating pulses from generator 39 (Fig. 1) are supplied over lead 40 and through a pair of series-connected coupling condensers 126 to the control grid of device 124. The junction of condensers 126 is connected to the anode and control electrode of a diode-connected triode-type electron discharge device 127. The anode and control electrode of device 127 are grounded through a load resistor and its cathode is directly connected to ground. Device 127 serves to prevent the applied pulses over lead 40 from driving the control electrode of device 124 positive relative to its cathode.

The anode of another diode 128 is directly connected to the control grid of device 124. This diode's cathode is connected to the by-passed tap of a voltage divider 129 that is shunted across negative source 119. Diode 128 and its associated circuit operate as a biased limiter which inhibits the occurrence of a positive potential at the control grid of device 124.

It may be appropriate to point out that in the illustrated application of the invention of Fig. 1, it is important that the potential applied to amplifier 18 over lead 42 be negative relative to ground and should not be positive for proper operation of this amplifier. This is done in order to limit the range of operation of the noise control circuit so that it is effectively disabled in the "on target" condition wherein amplification control is provided solely by A. G. C. unit 17 via lead 45. The diode 128 and diode-connected triode 127, just described, are utilized to meet this requirement.

The applied gating pulses, represented by the wave 130 in Fig. 4, are supplied through coupling condensers 126 to the control grid of device 124 and the potential at the control grid is also governed by the developed control potential because of the connection to condenser 121. Device 124 translates pulse-wave 130 which appears as pulse-wave 130' in its cathode circuit, however, since the D. C. potential at the control grid of cathode follower 124 depends upon the control potential at condenser 121, the pulse components of wave 130' are effectively displaced with respect to the ground potential by an amount depending upon the magnitude of the control potential. This is illustrated by the horizontal dash line 131 which intercepts the pulse of wave 130'. The arrow associated with line 131 indicates that the pulse and the line may be displaced in either polarity sense relative to one another.

Thus, the gate pulses which are supplied to gated amplifier 18 over lead 42 are adjusted relative to ground potential in accordance with the occurrences of noise impulses. More specifically, an increase in potential in a negative sense at condenser 121, representing more frequently occurring noise impulses, depresses the gating pulses relative to ground and thereby decreases the amplification of stage 18. Conversely, less frequent noise impulses produce a less negative potential at condenser 121 to raise the gating pulses and increase amplification. Stated another way, a fixed negative bias is employed to disable amplifier 18 and the amplitude of the applied gating pulses is effectively adjusted relative to that bias to control amplification inversely with the time-occurrences of noise impulses.

In summary, the operation of the circuit in Fig. 4 may be defined as follows. Noise amplitude is predictable by a probability function and if the occurrences of noise impulses are integrated over a comparatively long time, this noise is above any predetermined level a given percentage of time. By counting the times in a fixed period of the occurrences of noise above a set level, the noise level may be determined. Multivibrator 101—102 together with condenser 121 may be considered as a counter which sums the occurrences of noise impulses. If the counter counts more than a predetermined number of pulses, the noise amplitude is too high and the integrated output at condenser 121 is utilized to reduce amplification of the receiver until the noise is at the proper level. Conversely, if very few noise impulses above the predetermined level appear, the control potential at condenser 121 decreases and the amplification of the receiver is increased until once again the given number of noise pulses are counted.

Any noise impulse having an amplitude greater than level 114 of Fig. 5(A) is counted, regardless of its actual amplitude. Consequently, a pulse of extremely high amplitude merely is counted as one pulse and cannot operate to reduce gain of the receiver to a greater extent than any other pulse above level 114. It is thus apparent that the noise-responsive control circuit in accordance with my present invention maintains a constant output noise level in the associated equipment over a wide variety of noise-pulse amplitude conditions.

In the range-tracking function of the apparatus wherein echo pulses having an amplitude greater than the noise level are received, A. G. C. unit 17 supplies to amplifier 16, a gain-reducing control potential. This tends to decrease the noise level at the output of amplifier 18 and hence circuit 43 produces a control potential which causes an increase in amplification in amplifier 18. Of course, the effect of each echo pulse upon the noise-responsive control circuit is the same as a single noise impulse and this circuit is relatively unaffected thereby. However, since the operating range of the noise responsive control circuit is limited, the amplification of stage 18 is increased to a predetermined degree during the reception of echo pulses and stable operation is achieved. Although in this particular embodiment of the invention, noise impulses are applied to the noise responsive control circuit during 48 microsecond intervals which follow each transmitted pulse by one-half microsecond, it is evident that other timing relationships may be employed. For example, a sample of the noise output which occurs beyond each of the maximum range interval, i. e., between the termination of the 48 microsecond pulse and the following transmitted pulse, may be supplied to the circuit. Arrangements for providing this type of sampling are disclosed in the copending applications of J. L. Dunn, Serial No. 115,889, filed September 15, 1949, now Patent No. 2,783,466, issued February 26, 1957, and of L. C. Murdock, Serial No. 206,076, filed January 15, 1951, now Patent No. 2,711,531, issued June 21, 1955, both of which are assigned to the present assignee.

The embodiment of my invention illustrated in Fig. 6 may be utilized in connection with a wave signal receiver which may or may not be associated in a pulse-type system. Radio-frequency energy is intercepted by an antenna 200 and supplied to a mixer-oscillator 201 wherein the received energy is heterodyned with local oscillations to generate an intermediate-frequency wave. The latter wave is amplified in an intermediate-frequency amplifier 202 and supplied to a detector 203 wherein demodulation occurs. The detected components are amplified by cascaded amplifiers 204 and 205 before application to a utilization device 206.

The output of amplifier 204 is supplied through a coupling condenser 100' to a noise-responsive control circuit similar in many respects to the one illustrated in Fig.

4. Corresponding elements are designated by the same reference numerals followed by a prime (′) designation.

Let it be assumed that the receiver of Fig. 6 is subject to periods wherein no radiated signals are to be intercepted and in which a constant level of noise output must be supplied to utilization device 206. The noise output of amplifier 204 is applied to the normally conductive device of multivibrator 101′—102′ and a pulse of constant amplitude and duration is developed at anode resistor 107′ in response to each noise impulse. Of course, the level of significant noise impulses is regulated by adjusting tap 109′ of cathode resistor 104′. The derived pulses are supplied to an integrating circuit including diode rectifier 116′ and charging condenser 121′. The associated circuit including multivibrator 101′—102′, diode 116′, condenser 121′ is identical to the corresponding portion of the circuit of Fig. 4.

A control potential thus is developed at condenser 121′, of the illustrated polarity, and having a magnitude dependent upon the number of noise impulses occurring in a given interval of time. This control potential is applied to intermediate frequency amplifier 202 for controlling the amplification inversely with the frequency of occurrence of noise impulses.

Further operating details and advantages of the circuit arrangement in Fig. 6 follow that presented in connection with Fig. 4, and, hence, need not be repeated.

While particular embodiments of my invention have been shown and described, it is apparent that changes or modifications may be made without departing from the invention in its broader aspects, and therefore, the aim in the appended claims is to cover all such changes and modifications as fall within the true spirit and scope of my invention.

What I claim as new and desire to secure by Letters Patent of the United States is:

1. The combination, in wave-translating apparatus having an output circuit wherein impulse type noise and echo components appear, of means coupled to said output circuit for deriving a series of pulses of fixed amplitude in response to noise and echo impulses appearing during spaced apart known units of time which have amplitudes at least equal to a predetermined threshold level, means coupled to said first-mentioned means for deriving a control signal representing the number of pulses in said series, and means for adjusting an operating characteristic of said apparatus in accordance with said control signal.

2. The combination, in wave-translating apparatus having an output circuit wherein impulse-type noise and echo components appear, of means coupled to said output circuit for deriving a series of pulses of fixed amplitude corresponding to noise and echo impulses appearing during spaced apart known units of time which have amplitudes exceeding a predetermined threshold level, means coupled to said first-mentioned means for deriving a control signal representing the number of pulses in said series, and means for adjusting an operating characteristic of said apparatus in accordance with said control signal.

3. The combination, in wave-translating apparatus having an output circuit wherein impulse-type noise and echo components appear and having a controlled circuit, of means coupled to said output circuit for deriving a series of pulses of fixed amplitude corresponding to noise and echo impulses appearing during spaced apart known units of time having amplitudes at least equal to a predetermined threshold level, a threshold control included in said means for adjustably fixing said predetermined threshold level, means coupled to said first-mentioned means for deriving a control potential representing the number of pulses in said series, and means coupling said last-mentioned means to said controlled circuit of said apparatus for utilizing said control potential to adjust an operating characteristic of said apparatus.

4. The combination, in wave-translating apparatus having an output circuit wherein impulse-type noise and echo components appear and having a controlled circuit, of counting means coupled to said output circuit for summing the number of noise and echo impulses having amplitudes at least equal to a predetermined threshold level and appearing during spaced apart known units of time to derive a control signal representing said number, and means coupling said counting means to said controlled circuit of said apparatus for utilizing said control signal to adjust an operating characteristic of said apparatus.

5. The combination, in wave-translating apparatus having an output circuit wherein impulse-type noise and echo components appear and having a controlled circuit, of normally inoperative circuit means including an input circuit coupled to said output circuit and adapted to be operatively conditioned by an impulse having an amplitude at least equal to a predetermined threshold level thereby to produce an output pulse and including an output circuit for deriving a series of output pulses of fixed amplitude corresponding in number to noise and echo impulses appearing during spaced apart known units of time of an amplitude at least equal to said predetermined threshold level, means coupled to said circuit means for deriving a control potential representing the number of pulses in said series, and means coupling said last-mentioned means to said controlled circuit of said apparatus for utilizing said control potential to adjust an operating characteristic of said apparatus.

6. The combination, in wave-translating apparatus having an output circuit wherein impulse-type noise and echo components appear, of means coupled to said output circuit for deriving a series of pulses of fixed amplitude in response to noise and echo impulses appearing during spaced apart known units of time which have amplitudes at least equal to a predetermined threshold level, means coupled to said first-mentioned means for continuously time-integrating the pulses in said series to derive a control signal, and means for adjusting an operating characteristic of said apparatus in accordance with said control signal.

7. The combination, in wave-translating apparatus having an output circuit wherein impulse-type noise and echo components appear, of circuit means coupled to said output circuit for deriving a series of pulses of fixed amplitude in response to noise and echo impulses having amplitudes at least equal to a constant threshold level, a capacitance coupled to said circuit means, a charging circuit including a unidirectionally conductive device coupled to said capacitance and providing a relatively low resistance charging path for quickly charging said capacitance in response to said pulses, a discharge circuit including an impedance having a relatively high resistance coupled to said condenser, the time-constant of the circuit comprising said capacitance and said impedance being greater than the period between essentially any consecutive pair in said series of pulses so that there is derived on said capacitance a control potential representing the number of pulses in said series, and means for adjusting an operating characteristic of said apparatus in accordance with said control potential.

8. The combination, in wave-translating apparatus having an output circuit wherein impulse-type noise and echo components appear, of means coupled to said output circuit for deriving a series of pulses of fixed amplitude and duration in response to noise and echo impulses appearing during spaced apart known units of time which have amplitudes at least equal to a predetermined threshold level, means coupled to said first-mentioned means for deriving a control signal representing the number of pulses in said series, and means responsive to said control signal to adjust the amplification of said apparatus inversely with the number of occurrences per unit time of said pulses.

9. The combination, in a wave-signal receiver having an output circuit wherein impulse-type noise and echo components appear and having a wave-translating stage including a controlled circuit for adjusting the amplification of said stage, of an alarm circuit coupled to said output circuit and reponsive to received waves having an amplitude greater than a predetermined threshold amplitude of said noise components, means coupled to said output circuit for deriving a series of pulses of fixed amplitude and duration in response to noise and echo impulses appearing during known units of time which have amplitudes at least equal to a constant threshold level, means coupled to said first-mentioned means for deriving a control potential representing the number of pulses in said series, and means coupling said last-mentioned means to said controlled circuit of said translating stage for utilizing said control potential to adjust the amplification of said stage inversely with the number of occurrences per unit time of said pulses and maintain an essentially constant average noise level at said alarm circuit.

10. The combination, in wave-signal receiver including a wave-translating stage having an amplification-control circuit and including a detector coupled to said stage and having an output circuit wherein impulse-type noise and echo components appear, of means coupled to said output circuit of said detector for deriving a series of pulses of fixed amplitude in response to noise and echo impulses appearing during spaced apart known units of time which have amplitudes at least equal to a predetermined threshold level, means coupled to said first-mentioned means for deriving a control signal representing the number of pulses in said series, and means for adjusting the amplification of said stage comprising means responsive to said control signal for adjusting the amplification of said amplification control circuit.

11. The combination, in a wave-signal receiver having an output circuit wherein impulse-type noise components appear and having a wave-translating stage including a controlled circuit for adjusting the amplification of said stage, of a pulse generator coupled to said output circuit for deriving a series of pulses of fixed amplitude in response to noise or echo impulses having a predetermined charactertistic, means coupled to said pulse generator for deriving a control potential representing the number of pulses in said series occurring within a given interval of time, means for applying a potential to said controlled circuit normally disabling said translating stage, means for deriving repetitive enabling pulses coupled to said controlled circuit for operatively conditioning said translating stage, and means coupling said first-mentioned means to said last-mentioned means for regulating the amplitude of said enabling pulses in response to the magnitude of said control potential thereby to determine the amplification of said translating stage during the occurrences of said enabling pulses in accordance with said control potential.

12. The combination, in pulse-echo apparatus comprising in a wave-signal receiver having an output circuit wherein impulse-type noise components appear and having a wave-translating stage including a controlled circuit for adjusting the amplification of said stage, of a pulse generator coupled to said output circuit for deriving a series of pulses of fixed amplitude in response to noise or echo impulses having a predetermined characteristic, means coupled to said pulse generator for deriving a control potential representing the number of pulses in said series occurring within a given interval of time, means for applying a potential to said controlled circuit normally to disable said translating stage, a range-tracking unit including means for deriving repetitive enabling pulses coupled to said controlled circuit for operatively conditioning said translating stage, the time-occurences of said enabling pulses being controlled relative to the pulses transmitted by said apparatus, and means coupling said first-mentioned means to said last-mentioned means for regulating the amplitude of said enabling pulses in response to the magnitude of said control potential thereby to determine the amplification of said translating stage during the occurrences of said enabling pulses in accordance with said control potential.

13. In combination with a receiver for periodic noise and echo pulses, means for counting the number of pulses received during known units of time, means for generating a control pulse having a period less than that of said periodic signals, means for generating a bias signal having an amplitude corresponding to the number of pulses counted within each of said known units of time, means for combining said control pulse and said bias signal, and means to control the gain of said receiver with said combined pulse and bias signal.

14. In combination with a receiver for periodic noise and echo pulses, a source of gating pulses, means for establishing a reference pulse amplitude level, means for counting the number of pulses received during a portion of each pulse period which exceed said level, means for adjusting the reference level of said gating pulses in accordance with the number of pulses counted, and means to vary the gain of said receiver with said adjusted level gating pulses.

15. An arrangement for adjusting the amplification of wave translating apparatus which translates noise and echo pulses comprising means for generating a pulse of fixed amplitude and duration in response to each noise and echo pulse received during spaced apart known units of time which exceed a predetermined threshold level, means for integrating the number of generated pulses to derive a summation, and means for varying the amplification of said apparatus in accordance with said summation.

16. Apparatus for adjusting a characteristic of a receiver which receives noise and echo pulses, comprising means for establishing a constant reference pulse amplitude level, means for counting the number of noise and echo pulses received during spaced apart known units of time which exceed said level, and means for varying said characteristic of said receiver in accordance with the number of pulses counted in each of said known units of time.

17. An arrangement for adjusting a characteristic of a receiver which receives noise and echo pulses comprising means for counting the number of noise and echo pulses received by said receiver during spaced apart known units of time which have amplitudes at least equal to a predetermined threshold level, and means for varying the gain of said receiver in accordance with the number of pulses counted in each of said known units of time.

18. An arrangement for adjusting the gain of a receiver which receives recurrent random noise and echo pulses comprising means for establishing a constant reference pulse amplitude level, means for counting during each signal recurrence period the number of noise and echo pulses which exceed said level, and means for modifying the gain of said receiver in accordance with the number of pulses counted in each of said recurrence periods.

References Cited in the file of this patent

UNITED STATES PATENTS

| | | |
|---|---|---|
| 2,060,969 | Beers | Nov. 17, 1936 |
| 2,440,289 | Pensyl | Apr. 27, 1948 |
| 2,519,359 | Dean | Aug. 22, 1950 |
| 2,594,916 | Gulnac | Apr. 29, 1952 |

FOREIGN PATENTS

| | | |
|---|---|---|
| 586,284 | Great Britain | Mar. 13, 1947 |